United States Patent [19]
Moore et al.

[11] Patent Number: 5,526,964
[45] Date of Patent: Jun. 18, 1996

[54] FUEL DISPENSING SYSTEM

[76] Inventors: Bobby P. Moore, 22 Woodhall Dr., Mulberry, Fla. 33860-8521; Arthur A. Sabatinelli, 11652 NW. 19th Dr., Coral Springs, Fla. 33071-5742

[21] Appl. No.: 273,982

[22] Filed: Jul. 12, 1994

[51] Int. Cl.⁶ ...................................................... B67D 5/40
[52] U.S. Cl. ...................................... 222/383.1; 137/234.6
[58] Field of Search ................................. 222/108, 129, 222/372, 383.1; 137/234.6

[56] References Cited

U.S. PATENT DOCUMENTS

| | | | |
|---|---|---|---|
| 2,959,826 | 11/1960 | Larsen et al. | 137/234.6 X |
| 4,989,634 | 2/1991 | Rieseck | 137/234.6 X |
| 5,390,713 | 2/1995 | Fiech | 137/234.6 X |

*Primary Examiner*—Gregory L. Huson
*Attorney, Agent, or Firm*—A. W. Fisher, III

[57] ABSTRACT

A fuel dispensing system comprising a foundation module including an underground fuel reservoir to store fuel to be dispensed and a conduit containment trough to house a fuel supply conduit and fuel dispensing conduit therein, a fuel dispensing module including a pump island to support a fuel dispensing device thereon and a canopy module held in fixed spaced relationship above the fuel dispensing module.

35 Claims, 5 Drawing Sheets

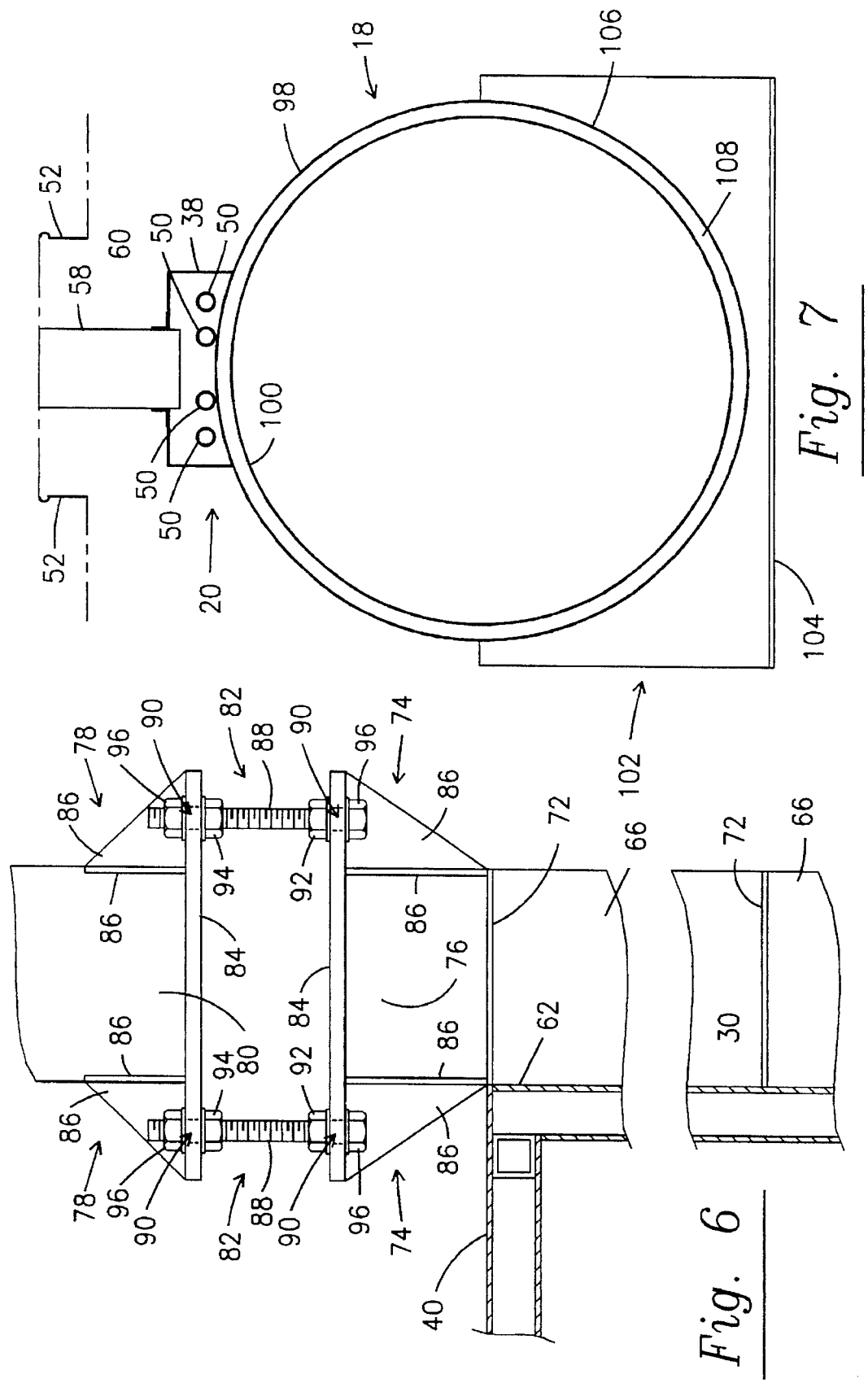

FUEL DISPENSING SYSTEM

BACKGROUND OF THE DISCLOSURE

1. Field of the Invention

A prefabricated modular fuel dispensing system comprising a foundation module including an underground fuel reservoir, a fuel dispensing module including a pump island and a canopy module including an upper canopy member held in fixed spaced relationship above the fuel dispensing module configured to be integrated into a unitized, mutually supportive structure.

2. Description of the Prior Art

Commonly, gasoline pumps are mounted on an island and connected to gasoline tanks located at a distance. This is inconvenient and requires elaborate piping arrangements with other disadvantages.

U.S. Pat. No .2,959,826 describes a gasoline station in which pumps are arranged on an island with the gasoline reservoir disposed immediately beneath the island. The gasoline reservoir is preferably divided into a plurality of compartments imbedded in the ground having a layer of cement poured on top thereof. The gasoline pumping means, preferably a plurality of pumps one for each compartment, is, in turn, mounted on the platform. The platform is arranged so there is an adjustable space between the top of the tank or the cement layer covering the tank and the deck of the platform. This space accommodates the filling means.

U.S. Pat. No. 3,777,774 shows a gas bar including a prefabricated kiosk secured to a foundation anchored within the ground and extending slightly above the level of the ground. A post is provided which is anchored in the foundation centrally within the kiosk which extends upwardly through the roof of the kiosk. At least two planetary services islands are disposed radially from the center of the kiosk. The service island includes a foundation securely anchored within the ground that extends above the ground and at least one gasoline dispensing pump thereon. An arched, cantilevered light fixture arm is provided for each service island.

U.S. Pat. No. 4,988,020 teaches a portable fueling facility for aircraft or ground vehicles including at least one storage tank having an outer tank as secondary containment and at least one pump for dispensing fuel. A number of saddle members support the outer tank on a flat horizontal surface. A deck compartment is provided beneath the pump as secondary containment about the supply pipes used to supply the pump and the refueling tubes used to refuel the storage tank.

U.S. Pat. No. 3,076,205 describes a floating marine fuel supply terminal comprising a compartmented cylindrical hull having a service deck thereon and three concentrically disposed liquid tight storage tanks thereunder consisting of an outer ballast water tank, an intermediate gasoline tank and an inner diesel fuel tank. The outer tank is adapted to hold ballast water in an amount approximate equal to the combined weights of the gasoline and diesel fuel to be stored in the other tanks. The diesel fuel tank has a hollow axial core portion which defines an interior recess under said deck and above a preselected water line. A first pump is mounted on the deck having an intake line extending to the bottom of the ballast water tank and further extending externally of the hull below the water line and a discharge line extending into the ballast water tank. A second pump is mounted on the deck having an intake line extending to the bottom of the ballast water tank and a discharge line extending externally of the hull immediately above the water line. A superstructure is provided on the deck for housing personnel and equipment of the type associated with marine refueling services and for carrying such equipment as is required by the coast guard and other marine authorities.

U.S. Pat. No. 2,182,126 teaches a filling station for supplying automobiles with fuel and compressed air comprising a substantially horizontal housing located at ground level, a pair of upright reservoir housings of substantially equal weight supported on the horizontal housing with fuel reservoirs, a compressed air tank located under the horizontal housing supporting same. A foundation footing disposed beneath the compressed air tank supports the compressed air tank; while, a central upright housing located substantially in line with the air tank is supported thereby. The filling station further includes a liquid fuel reservoir, a pump in the central housing for filling the reservoir, and an air compressor mounted in the central housing for supplying compressed air to the air tank.

SUMMARY OF THE INVENTION

The present invention relates to a prefabricated modular fuel dispensing system comprising a foundation module including an underground fuel reservoir to store fuel to be dispensed, a fuel dispensing module including a pump island to operatively support a plurality of fuel dispensing devices thereon coupled to the underground fuel reservoir to receive fuel therefrom and a canopy module including an upper canopy member held in fixed spaced relationship above the fuel dispensing module. The foundation module, fuel dispensing module and canopy module are configured to be integrated into a unitized, mutually supportive structure.

More specifically, the underground fuel reservoir includes a plurality of separate fuel storage compartments to store a corresponding plurality of fuels to be dispensed therefrom. A conduit containment trough is attached to the underground fuel reservoir to operatively house a corresponding plurality of fuel supply conduits to feed fuel from an external source to the underground fuel reservoir and a corresponding plurality of fuel dispensing conduits from the underground fuel reservoir to the fuel dispensing devices to selectively receive fuel from the underground fuel reservoir thereof the plurality of fuel dispensing conduits.

The upper canopy member is held in fixed spaced relationship above the fuel dispensing module by a plurality of substantially vertical canopy support columns secured to the underground fuel reservoir. Each of the plurality of substantially vertical canopy support columns comprises a lower column member affixed to the underground fuel reservoir and a corresponding upper column member coupled to the corresponding lower column member by a canopy leveling means coupled to the lower end of the corresponding upper column member of and affixed to the canopy module at the upper end of the corresponding upper column member. Each of the lower column members are anchored or secured to the underground fuel reservoir by a stabilizing means.

To install, with the underground fuel reservoir placed in the ground, the underground fuel reservoir and the conduit containment trough are covered. The pump island is formed once the underground fuel reservoir is buried. With the lower column members affixed and stabilized to opposite ends of the underground fuel reservoir and extending above ground, the corresponding upper column members are affixed thereto and leveled. The upper canopy member is affixed to the upper end portions of the upper column members.

When so installed and assembled, the underground fuel reservoir provides stabilization and support for the fuel dispensing module and canopy module.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 6 is a partial detailed side view of the substantially vertical canopy support column and canopy leveling means.

FIG. 7 is a partial cross-sectional end view of an alternate embodiment of the underground fuel reservoir.

Similar reference characters refer to similar parts throughout the several views of the drawings.

DETAILED DESCRIPTION OF THE PREFERRED EMBODIMENT

Figure 1:
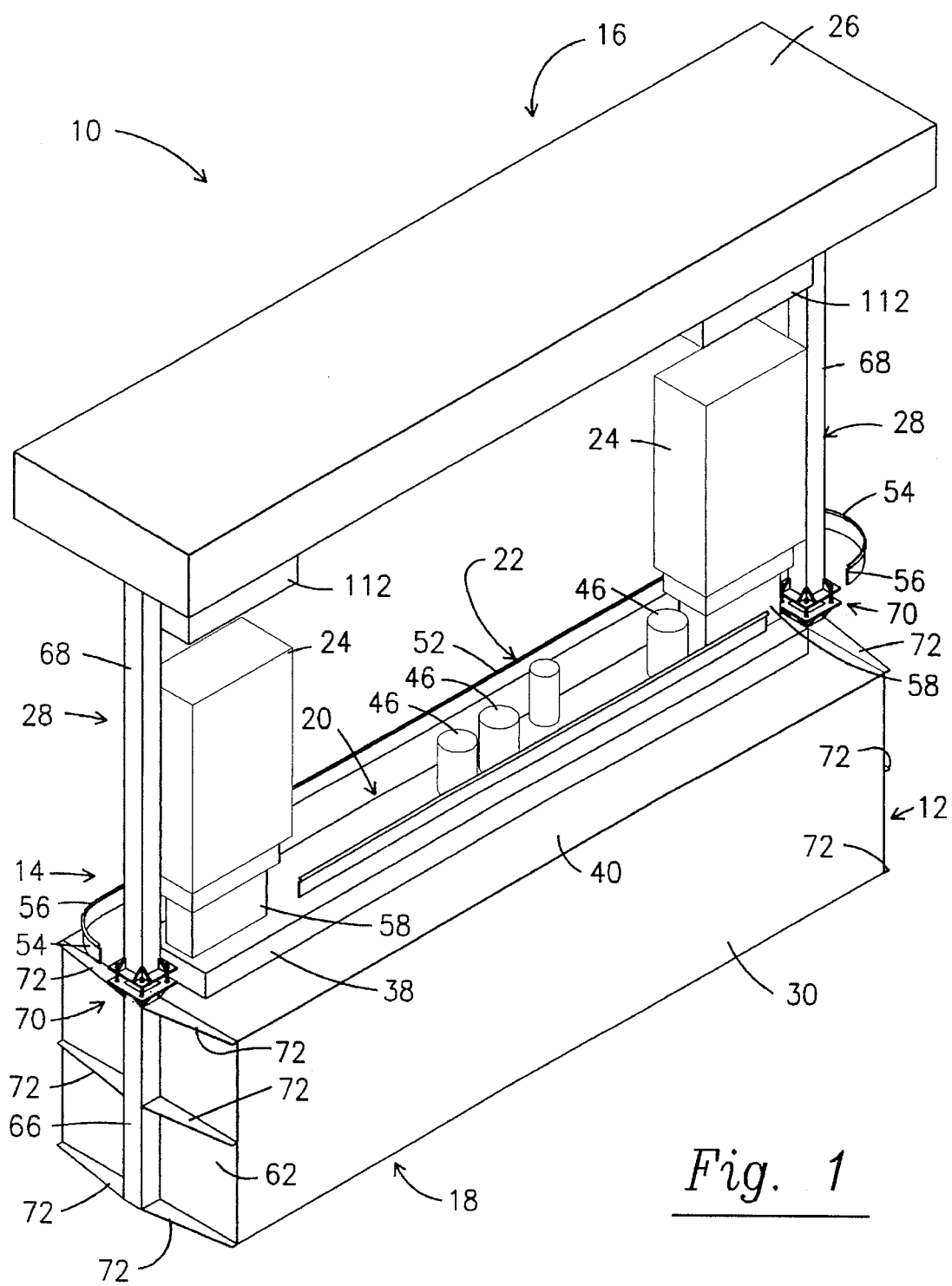
FIG. 1 is a perspective view of the prefabricated modular fuel dispensing system.
Figure 3:
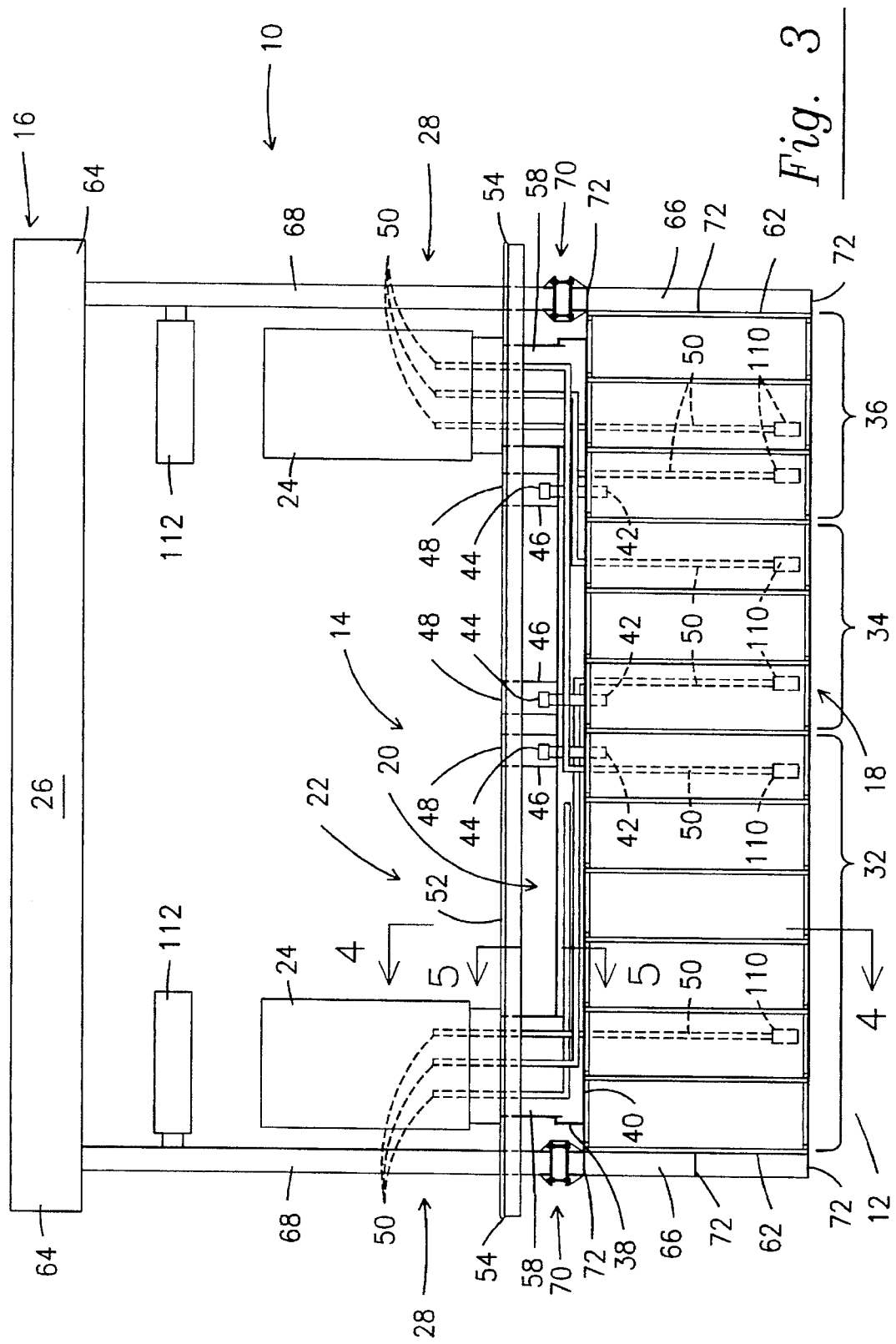
FIG. 3 is a side view of the prefabricated modular fuel dispensing system.

As best shown in FIGS. 1 and 3, the present invention relates to a prefabricated modular fuel dispensing system generally indicated as 10 comprising a foundation module generally indicated as 12, a fuel dispensing module generally indicated as 14 and a canopy module generally indicated as 16 configured to be assembled into an integrated, unitary mutually supportive structure. As described more fully hereinafter, the foundation module 12 comprises an underground fuel reservoir generally indicated as 18 to store fuel to be dispensed therein and a conduit containment trough generally indicated as 20 attached to the underground fuel reservoir 18 to operatively house a plurality of fuel supply conduits and a plurality of fuel dispensing conduits therein; while, the fuel dispensing module 14 comprises a raised pump island generally indicated as 22 to operatively support a plurality of fuel dispensing devices each indicated as 24 and the canopy module 16 comprises an upper canopy member 26 held in fixed spaced relationship above the fuel dispensing module 14 by a plurality of substantially vertical canopy support columns each generally indicated as 28 secured to foundation module 12.

Figure 2:
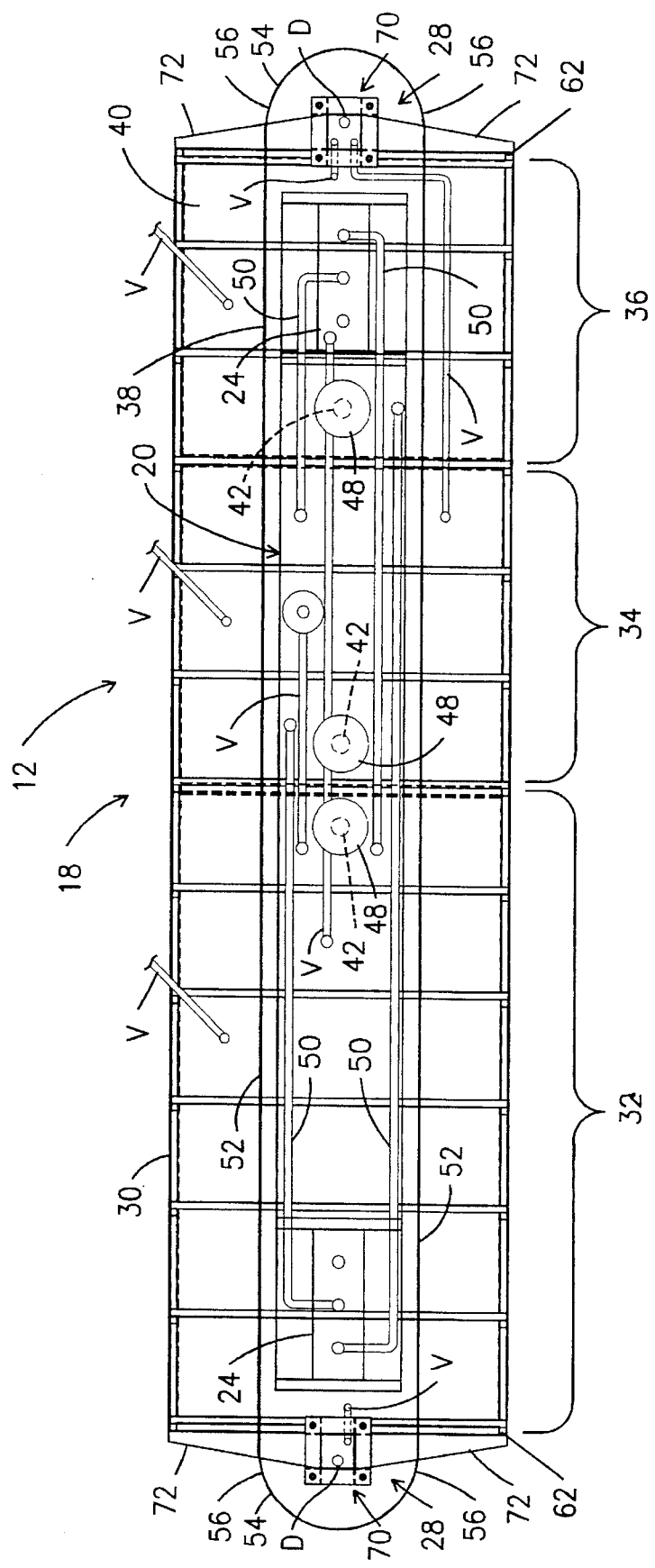
FIG. 2 is a top view of the prefabricated modular fuel dispensing system.

As best shown in FIGS. 1 through 3, the underground fuel reservoir 18 comprises a double wall rectilinear tank 30 including a first, second and third fuel compartment indicated as 32, 34 and 36 respectively to store different fuels to be selectively fed to each of the fuel dispensing devices 24 as described more fully hereinafter.

As best shown in FIGS. 2 through 5, the conduit containment trough 20 comprises a conduit housing 38 mounted to the top wall 40 of the double wall rectilinear tank 30. Each of the plurality of fuel supply conduits comprises a substantially vertical pipe 42 in fluid communication with corresponding first, second and third fuel compartments 32, 34 and 36. The upper end of each of the substantially vertical pipes 42 is covered with a corresponding cap 44. Moreover, each substantially vertical pipe 42 is disposed within a pipe housing 46 extending through pump island 22 and capped with a corresponding cover 48. Each of the plurality of fuel dispensing conduits comprises a fuel hose 50 extending between corresponding first, second and third fuel compartments 32, 34 and 36 and each of the fuel dispensing devices 24. As best shown in FIG. 2, the underground fuel reservoir 18 includes a vent system and drain system with the various components indicated as V and S respectively.

Figure 4:
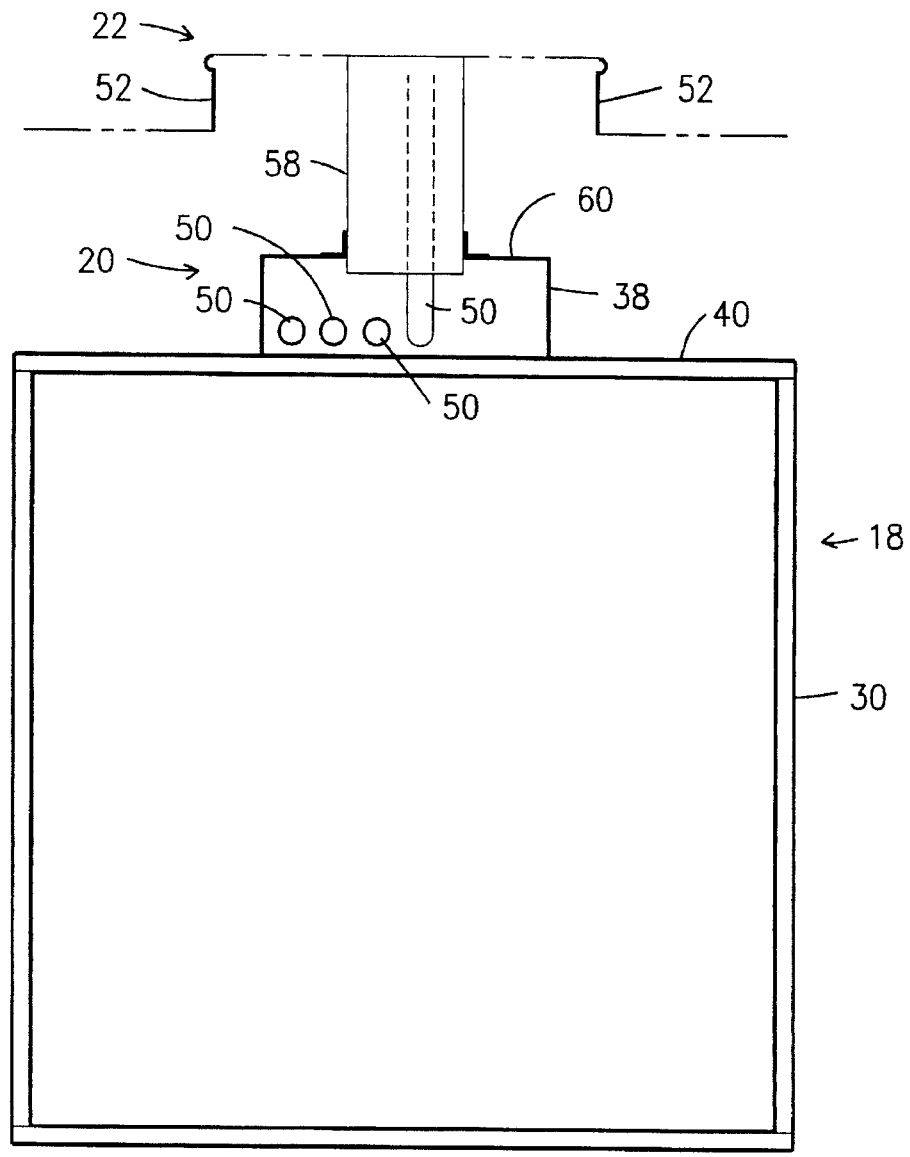
FIG. 4 is a partial cross-sectional end view of the prefabricated modular fuel dispensing system taken along lines 4—4 of FIG. 3.

As best shown in FIGS. 1 through 3, the raised pump island 22 comprises a form including a pair of substantially parallel elongated side members each indicated as 52 and a pair of arcuate end members each indicated as 54 extending between adjacent ends of the pair of substantially parallel elongated side members each indicated as 56. The form extends around the substantially vertical canopy support column 28 to receive concrete or the like to create the raised pump island 22 over the foundation module 12 to operatively support the fuel dispensing devices 24. As best shown in FIGS. 1, 3 and 4, a hollow riser 58 extends vertically from the top 60 of the conduit housing 38 to the bottom of each of the fuel dispensing devices 24 to house the fuel hoses 50 coupled between the first, second and third fuel compartments 32, 34, and 36 and each of the fuel dispensing devices 24.

As best shown in FIGS. 1 through 3, each of the substantially vertical canopy support columns 28 extends upwardly from opposite ends 62 of the double wall rectilinear tank 30 to support opposite end portions 64 of the upper canopy member 26. As best shown in FIGS. 1 and 3, each of the substantially vertical canopy support columns 28 comprises a lower column member 66 coupled to an upper column member 68 by a canopy leveling means generally indicated as 70. As best shown in FIG. 1, the lower column member 66 is affixed to the opposite ends 62 of the double wall rectilinear tank 30 by a stabilizing means comprising a plurality of sets of gussets or retainer plates each indicated as 72 disposed in pairs on opposite sides of the lower column member 66 and spaced vertically along the lower column member 66.

Figure 5:
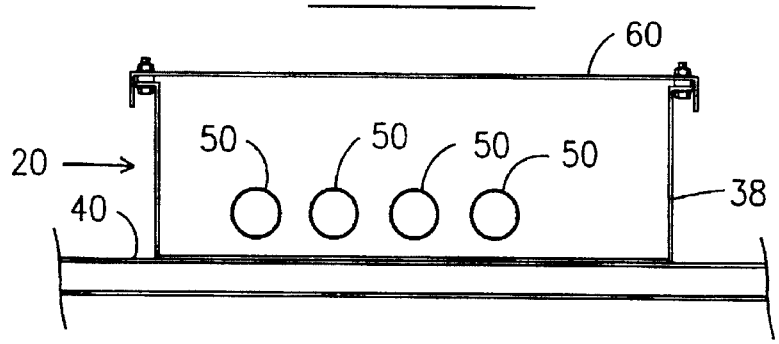
FIG. 5 is a partial cross-sectional end view of the prefabricated modular fuel dispensing system taken along lines 5—5 of FIG. 3.

As best shown in FIG. 5, the canopy leveling means 70 comprises a lower coupling member generally indicated as 74 affixed to the upper end 76 of the lower column member 66 and an upper coupling member generally indicated as 78 affixed to the lower end 80 of the upper column member 68 coupled together by a plurality of leveling members each generally indicated as 82. The lower coupling member 74 and the upper coupling member 78 each comprises a substantially flat base 84 affixed to the upper end 76 of the lower column member 66 and the lower end 80 of the upper column member 68 respectively. A plurality of side support members each indicated as 86 extend between the substantially flat bases 84 and the upper end 76 and lower end 80. Each leveling member 82 comprises a rigid elongated externally threaded element 88 extending through a corresponding pair of aligned apertures 90 formed through the substantially flat bases 84 of the lower coupling member 74 and the upper coupling member 78. The distance or space between the substantially flat bases 84 and the relative parallel alignment therebetween are controlled by the distance between corresponding lower and upper adjustment means or nuts indicated as 92 and 94 respectively longitudinally movably or adjustably mounted on opposite ends of each of the rigid elongated externally threaded element 88. Each of the rigid elongated externally threaded elements 88 is secured to the substantially flat base 84 of the lower coupling member 74 and the upper coupling member 78 by a fastening means or nut 96 secured to the rigid elongated externally threaded element 88 on the side of the substantially flat bases 84 of the lower coupling member 74 and the upper coupling member 78 opposite the lower adjustment means 92 and upper adjustment means 94 respectively.

FIG. 7 shows an alternate embodiment of the underground fuel reservoir 18. In particular, the underground fuel reservoir 18 comprises a substantially cylindrical tank 98 having the conduit containment trough 20 affixed to the top 100 thereof in alignment with the first, second or third fuel compartments 32, 34 and 36 and the various access apertures for the substantially vertical pipes 42, pipe housings 46 and fuel hose 50 formed therethrough and the risers 58. The substantially cylindrical tank 98 is supported in the ground by a plurality of vertically disposed cradles or tank supports generally indicated as 102. Each cradle or tank support 102 comprises a rectilinear outer periphery 104 to rest on a flat underground surface and an arcuate or concave inner periphery 106 to engage and support the bottom surface 108 of the substantially cylindrical tank 98.

To install, with the underground fuel reservoir 18 placed and leveled in the ground, the underground fuel reservoir 18 and the conduit containment trough 20 are covered. The raised pump island 22 is formed once the underground fuel reservoir 18 is buried. With each of the lower column members 66 affixed and stabilized to opposite ends 62 of the underground fuel reservoir 18 and extending above ground, the corresponding upper column members 68 are affixed thereto and leveled or adjusted by the canopy leveling means 70. The upper canopy member 26 is affixed to the upper end portions of the upper column members 68.

When so installed and assembled, the underground fuel reservoir 18 provides stabilization and support for the fuel dispensing module 14 and canopy module 16.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A prefabricated modular fuel dispensing system comprising a foundation module including an underground fuel reservoir having at least one fuel storage-compartment therein to store a fuel to be dispensed and a conduit containment trough attached to said underground fuel reservoir to house a corresponding fuel supply conduit and a corresponding fuel dispensing conduit therein to feed fuel to and from said underground fuel reservoir respectively, a fuel dispensing module including a pump island to operatively support at least one fuel dispensing device thereon coupled to said fuel storage compartment by said fuel dispensing conduit to selectively receive fuel therefrom and a canopy module including an upper canopy member held in fixed spaced relationship above said fuel dispensing module by at least two canopy support columns secured to said underground fuel reservoir, said foundation module, said fuel dispensing module and said canopy module integrated into a unitized, mutually supportive structure when assembled into said prefabricated modular fuel dispensing system, said canopy support columns extend upwardly from opposite ends of said underground fuel reservoir to support opposite end portions of said upper canopy member, each said canopy support column comprises a lower column member coupled to an upper column member by a canopy leveling means, said canopy leveling means comprises a lower coupling member affixed to the upper end of the lower column member and an upper coupling member affixed to the lower end of the upper column member coupled together by a plurality of leveling means.

2. The prefabricated fuel dispensing system of claim 1 wherein said underground fuel reservoir comprises a rectilinear tank to rest on a flat underground surface.

3. The prefabricated modular fuel dispensing system of claim 1 wherein said pump island comprises a form including a pair of substantially parallel elongated side members and a pair of arcuate end members extending between adjacent ends of said pair of substantially parallel elongated side members.

4. The prefabricated modular fuel dispensing system of claim 3 wherein said form extends around said canopy support columns to receive concrete to create a raised pump island over said foundation module to operatively support said fuel dispensing device.

5. The prefabricated fuel dispensing system of claim 1 wherein said lower coupling member and said upper coupling member each comprises a substantially flat base affixed to the upper end of said lower column member and the lower end of said upper column member respectively.

6. The prefabricated fuel dispensing system of claim 5 wherein said lower coupling member and said upper coupling member each further include at least one side support member extending between said substantially flat base and said upper end and said lower end respectively.

7. The prefabricated modular fuel dispensing system of claim 1 wherein said conduit containment trough comprises a conduit housing.

8. The prefabricated modular fuel dispensing system of claim 7 wherein said fuel supply conduit comprises a pipe in fluid communication with said fuel storage compartment.

9. The prefabricated modular fuel dispensing system of claim 8 wherein the upper end of said pipe is selectively covered with a cap.

10. The prefabricated modular fuel dispensing system of claim 8 wherein said pipe is disposed within a pipe housing.

11. The prefabricated modular fuel dispensing system of claim 10 wherein said pipe housing is selectively capped with a cover.

12. The prefabricated modular fuel dispensing system of claim 8 wherein said fuel dispensing conduit comprises a fuel hose extending between said fuel storage compartment and said fuel dispensing device.

13. The prefabricated modular fuel dispensing system of claim 12 also comprising a hollow riser extending from the top of said conduit housing to the bottom of said fuel dispensing device to house said fuel hose coupled between said fuel storage compartment and said fuel dispensing device.

14. The prefabricated fuel dispensing system of claim 1 wherein each said leveling member comprises a rigid element extending through a corresponding pair of aligned apertures formed through said lower coupling member and said upper coupling member having a lower adjustment means attached to said rigid element adjacent said lower coupling member and an upper adjustment means attached to said upper coupling member wherein the distance between said lower coupling member and said upper coupling member and the relative parallel alignment therebetween are controlled by varying the distance between corresponding said lower adjustment means and said upper adjustment means.

15. The prefabricated fuel dispensing system of claim 14 wherein each said rigid element is secured to said lower coupling member and to said upper coupling member by a fastening member secured to said rigid element.

16. The prefabricated fuel dispensing system of claim 15 wherein said lower column member is affixed to opposite ends of said underground fuel reservoir by a stabilizing means.

17. The prefabricated fuel dispensing system of claim 16 wherein said stabilizing means comprises at least a pair of gussets disposed on opposite sides of said lower column member.

18. The prefabricated fuel dispensing system of claim 17 wherein said stabilizing means further includes a plurality of pairs of gussets spaced vertically on opposite sides of said lower column member.

19. A prefabricated modular fuel dispensing system comprising a foundation module including an underground fuel reservoir having at least one fuel storage-compartment therein to store a fuel to be dispensed and a conduit containment trough attached to said underground fuel reservoir to house a corresponding fuel supply conduit and a corresponding fuel dispensing conduit therein to feed fuel to and from said underground fuel reservoir respectively, a fuel dispensing module including a pump island to operatively support at least one fuel dispensing device thereon coupled to said fuel storage compartment by said fuel dispensing conduit to selectively receive fuel therefrom and a canopy module including an upper canopy member held in fixed spaced relationship above said fuel dispensing module by at least two canopy support columns secured to said underground fuel reservoir, said foundation module, said fuel dispensing module and said canopy module integrated into a unitized, mutually supportive structure when assembled into said prefabricated modular fuel dispensing system, said canopy support columns being affixed to opposite ends of said underground fuel reservoir by a stabilizing means.

20. The prefabricated fuel dispensing system of claim 19 wherein said stabilizing means comprises at least a pair of gussets disposed on opposite sides of said lower column member.

21. The prefabricated fuel dispensing system of claim 20 wherein said stabilizing means further includes a plurality of pairs of gussets spaced vertically on opposite sides of said lower column member.

22. The prefabricated fuel dispensing system of claim 19 wherein each said canopy support column comprises a lower column member coupled to an upper column member by a canopy leveling means.

23. The prefabricated fuel dispensing system of claim 22 wherein said canopy leveling means comprises a lower coupling member affixed to the upper end of the lower column member and an upper coupling member affixed to the lower end of the upper column member coupled together by a plurality of leveling members.

24. The prefabricated fuel dispensing system of claim 23 wherein said lower coupling member and said upper coupling member each comprises a substantially flat base affixed to the upper end of said lower column member and the lower end of said upper column member respectively.

25. The prefabricated fuel dispensing system of claim 24 wherein said lower coupling member and said upper coupling member each further include at least one side support member extending between said substantially flat base and said upper end and said lower end respectively.

26. The prefabricated fuel dispensing system of claim 23 wherein each said leveling member comprises a rigid element extending through a corresponding pair of aligned apertures formed through said lower coupling member and said upper coupling member having a lower adjustment means attached to said rigid element adjacent said lower coupling member and an upper adjustment means attached to said upper coupling member wherein the distance between said lower coupling member and said upper coupling member and the relative parallel alignment therebetween are controlled by varying the distance between corresponding said lower adjustment means and said upper adjustment means.

27. The prefabricated fuel dispensing system of claim 26 wherein each said rigid element is secured to said lower coupling member and to said upper coupling member by a fastening member secured to said rigid element.

28. A prefabricated modular fuel dispensing system comprising a foundation module including an underground fuel reservoir having at least one fuel storage-compartment therein to store a fuel to be dispensed and a conduit containment trough attached to said underground fuel reservoir to house a corresponding fuel supply conduit and a corresponding fuel dispensing conduit therein to feed fuel to and from said underground fuel reservoir respectively, a fuel dispensing module including a pump island to operatively support at least one fuel dispensing device thereon coupled to said fuel storage compartment by said fuel dispensing conduit to selectively receive fuel therefrom and a canopy module including an upper canopy member held in fixed spaced relationship above said fuel dispensing module by at least two canopy support columns secured to said underground fuel reservoir, said foundation module, said fuel dispensing module and said canopy module integrated into a unitized, mutually supportive structure when assembled into said prefabricated modular fuel dispensing system, said canopy support columns extend upwardly from opposite ends of said underground fuel reservoir to support opposite end portions of said upper canopy member, each said canopy support column comprising a lower column member coupled to an upper column member by a canopy leveling means, said lower column member affixed to opposite ends of said underground fuel reservoir by a stabilizing means.

29. The prefabricated fuel dispensing system of claim 28 wherein said stabilizing means comprises at least a pair of gussets disposed on opposite sides of said lower column member.

30. The prefabricated fuel dispensing system of claim 29 wherein said stabilizing means further includes a plurality of pairs of gussets spaced vertically on opposite sides of said lower column member.

31. The prefabricated modular fuel dispensing system of claim 28 wherein said canopy leveling means comprises a lower coupling member affixed to the upper end of the lower column member and an upper coupling member affixed to the lower end of the upper column member coupled together by a plurality of leveling means.

32. The prefabricated fuel dispensing system of claim 31 wherein said lower coupling member and said upper coupling member each comprises a substantially flat base affixed to the upper end of said lower column member and the lower end of said upper column member respectively.

33. The prefabricated fuel dispensing system of claim 32 wherein said lower coupling member and said upper coupling member each further include at least one side support member extending between said substantially flat base and said upper end and said lower end respectively.

34. The prefabricated fuel dispensing system of claim 31 wherein each said leveling member comprises a rigid element extending through a corresponding pair of aligned apertures formed through said lower coupling member and said upper coupling member having a lower adjustment means attached to said rigid element adjacent said lower coupling member and an upper adjustment means attached to said upper coupling member wherein the distance between said lower coupling member and said upper coupling member and the relative parallel alignment therebetween are controlled by varying the distance between corresponding said lower adjustment means and said upper adjustment means.

35. The prefabricated fuel dispensing system of claim 34 wherein each said rigid element is secured to said lower coupling member and to said upper coupling member by a fastening member secured to said rigid element.

\* \* \* \* \*

UNITED STATES PATENT AND TRADEMARK OFFICE
CERTIFICATE OF CORRECTION

PATENT NO. :  5,526,964

DATED      :  June 18, 1996

INVENTOR(S) :  Bobby L. Moore and Arthur A. Sabatinelli

It is certified that error appears in the above-identified patent and that said Letters Patent is hereby corrected as shown below:

On the cover page of the patent, in item [76], the first named inventor should read -- Bobby L. Moore --.

Signed and Sealed this

Eleventh Day of April, 2000

Attest:

Q. TODD DICKINSON

Attesting Officer

Director of Patents and Trademarks